UNITED STATES PATENT OFFICE.

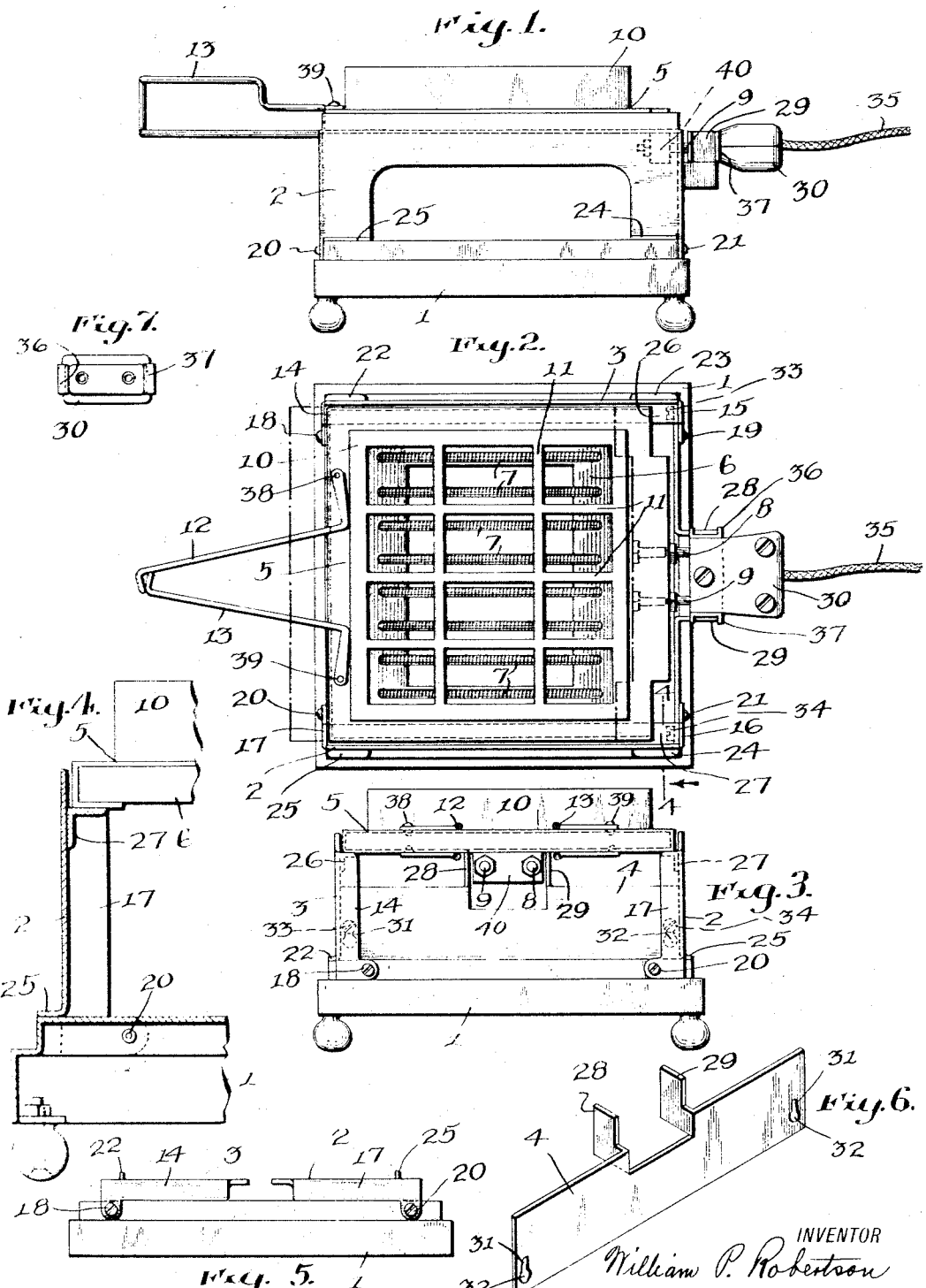

WILLIAM P. ROBERTSON, OF NEW YORK, N. Y., ASSIGNOR TO THE CALOREX CORPORATION, OF NEW YORK, N. Y., A CORPORATION OF NEW YORK.

ELECTRIC STOVE.

1,359,275.     Specification of Letters Patent.     Patented Nov. 16, 1920.

Application filed July 5, 1918. Serial No. 243,440.

*To all whom it may concern:*

Be it known that I, WILLIAM P. ROBERTSON, a citizen of the United States, and a resident of the city of New York, borough of Manhattan, county and State of New York, have invented certain new and useful Improvements in Electric Stoves, of which the following is a specification.

My invention relates to small electric stoves particularly adapted for quick and convenient use on a dining table.

One of the objects of my invention is to provide an electric stove the various parts of which are so formed and disposed that they may be folded or arranged into a convenient and compact form for shipping or storing away when not in use.

Another object of my invention is to provide means for eliminating the handling of the plug receptacle when connecting or disconnecting the electric current. In other types of small electric stoves the receptacle which the terminal plugs of the heating element engage must be connected or disconnected by hand after the current has first been turned on at the lamp socket. In such constructions when it is desired to cut off the current from the heating element the receptacle, which quickly becomes very hot, must be withdrawn from the terminal plugs by hand, and after being withdrawn is not then in convenient position for again connecting when the current for the heating element is again desired. By the present invention this inconvenience is entirely overcome, and furthermore there is no necessity with my device of the interposition between the lamp socket switch and the receptacle of a switch constructed to withstand the sudden change in electrical pressure when the heating element is connected or disconnected.

Another object of my invention is to provide a removable heating element and substitute therefor various other forms of heating elements.

Another object of my invention is to provide means for rapidly replacing the electric heating element should it burn out, thus avoiding the expense and delay in repair.

Another object of my invention is to so construct an electric stove as to provide facility for getting at the various parts for cleaning.

Other objects of my invention will be apparent from the combination and arrangement of the various parts as set forth in the following detailed description and as shown in the annexed drawings in which—

Figure 1 is a side view of my invention in operative position.

Fig. 2 is a plan view of the same.

Fig. 3 is an end view.

Fig. 4 is an enlarged sectional view taken on line 4—4 of Fig. 2.

Fig. 5 is an end view showing the sides in a collapsed or folded position.

Fig. 6 is a perspective view of the detachable or portable end plate showing its outwardly and upwardly extending arms.

Fig. 7 is an end view of the plug receptacle.

In the preferred embodiment of my invention the electric stove comprises a hollow base 1, sides 2 and 3 pivotally connected thereto, a removable end 4 and a heater 5. The heater 5 comprises an insulating plate 6, resistance wires 7 and terminal plugs 8 and 9, all of which are inclosed in a metal casing 10 which is provided with cross grids 11 on the top thereof, and handles 12 and 13 secured to said casing.

The base 1 is rectangular and is preferably of stamped metal and is made hollow and of such shape that it will fit neatly over the heater 5 when not in use.

As shown in Fig. 1 the sides or side plates 2 and 3 are cut away to form openings which are formed to allow the insertion of toast upon the top of the base so as to keep the same warm and also to provide facility in getting at the various parts for cleaning. The ends of the side plates 2 and 3 are turned inwardly to form flaps 14, 15, 16 and 17. The sides 2 and 3 are pivotally mounted on the base 1 by means of pivot pins 18, 19, 20 and 21, which pivot pins pass through the lower end of the flaps 14, 15, 16 and 17 and into the base 1. The lower end of the sides 2 and 3 are turned outwardly to form abutments or rests 22, 23, 24 and 25 for said sides, said abutments contributing to the support of the sides when the same are in an upright position. The sides are also provided with guideways 26, 27 (one of which is shown in section in Fig. 4) which are adapted to support the heater 5 when in operative position. Being pivoted to the base 1 the sides 2 and 3 can be folded inwardly so as to rest upon the base, as shown in Fig. 5.

The end plate 4 which is removable has outwardly and upwardly extending arms 28 and 29 which are adapted to receive and support the plug receptacle 30. The end plate 4 is also provided with slots 31, each of which has an enlarged portion 32 adapted to receive the studs 33, 34 which are secured to the inner face of flaps 16 and 17 respectively.

When it is desired to put the end plate 4 in place, the sides 2 and 3 are moved to their upright position. The end plate 4 is then placed upon the inside of the flaps 16 and 17 so that the studs 33 and 34 will enter the enlarged portion 32 of the slots 31. The end plate is then pushed downwardly so that the studs will be engaged and held by the slots.

The plug receptacle 30 which is connected by a cable or wire 35 to the source of current supply is provided with passageways 36, 37 adapted to engage the upwardly extending arms 28, 29, respectively, of the end plate 4, thereby holding the plug receptacle in position. The receptacle 30 is also provided with holes adapted to receive the terminal plugs 8 and 9.

The heater 5 which comprises an insulating plate 6, resistance wires 7 and terminal plugs 8 and 9, is sometimes referred to herein as the heating element. As heretofore pointed out the heating element is inclosed in the metal casing 10 which is provided with cross grids 11 on the top thereof to protect the heating element and upon which any material to be heated can be placed when the stove is in operation. The casing 10 is also provided with the handles 12 and 13 which are pivotally secured to the casing by means of the pivot pins 38, 39 passing respectively therethrough and through the casing 10 into the insulating plate 6.

The insulating plate 6 has a downwardly extending portion 40 to which are secured the terminal plugs 8 and 9. The heater 5 is so constructed that when the sides 2 and 3 are in operative position the heater 5 can be placed in position upon the guideways 26, 27 and be held in place by the upwardly extending portions of the sides 2 and 3.

To assemble my device for use, the sides 2 and 3 are first placed in an upright position and the end plate 4 placed in position so that the studs 33, 34 will engage the slots 31 therein. The plug receptacle is then secured to the end plate 4 by means of the passageways 36 and 37 therein engaging the upwardly extending arms 28, 29 of the end plate 4. The heater 5 is then slid into position by means of the handles 12 and 13 on the guideways 26 and 27, and when placed in operative position the terminal plugs 8 and 9 will be engaged by the holes in the plug receptacle 30, thereby making electrical contact with the cable 35. If it is desired at any time to disconnect the heating element all that is necessary is to withdraw the heater 5 to the dotted position shown in Fig. 2 whereby the terminal plugs 8 and 9 will be withdrawn from the plug receptacle 30. If desired any other form of heater 5 may be utilized so long as the same is constructed so as to be supported by the guideways 26 and 27 and provided with terminal plugs that will properly engage the plug receptacle 30.

If it is desired to ship my device or to pack the same away, the stove can be folded into compact form by folding the sides 2 and 3 over upon the base 1, as shown in Fig. 5. The removable end 4 is then laid upon the base and the handles 12 and 13 are folded alongside the heater 5 which is then placed within the base. The plug receptacle with its cable can be coiled on top and the stove is then in compact form and ready for shipment or for storage.

While I have shown and described the preferred embodiment of my invention I do not wish to be limited to the construction and arrangement of the parts herein shown and described, as the same may be varied without departing from the scope of my invention.

What I claim is:

1. In a device of the class described, the combination of a base, a heating element, sides pivotally secured to said base and movable into and out of position to support said heating element, and means for maintaining said sides in position to support the heating element.

2. A device of the class described having a base, supporting members pivotally secured thereto, guideways on said supporting members, and a heating element resting on and movable along said guideways.

3. In a device of the class described, the combination of a base, supporting members pivotally mounted on said base, means for holding said supporting members in an upright position, guideways on said supporting members, and a heating element resting on and movable along said guideways.

4. A device of the class described comprising a hollow base, supporting members pivotally mounted on said base, a removable member for maintaining said supporting members in an upright position, guideways carried by said supporting members, and an incased heating element resting on and movable along said guideways.

5. In combination, an electric heating element having outwardly projecting terminal plugs, pivotally attached supporting side members having guideways upon which said heating element may be slidably and removably mounted, a detachably mounted plug receptacle so attached and positioned in respect to the supporting guideways that the terminal plugs of the heating element will engage the plug receptacle when the heating element is placed in operative position.

6. In a device of the class described, the combination of a base, an independent electric heating element having projecting terminal plugs, means for supporting the heating element above said base, a detachably mounted plug receptacle above said base, and means for causing the terminal plugs to engage with the plug receptacle when the heating element is in operative position.

7. In a device of the class described, the combination of a movable electrical heating element having outwardly-extending terminal plugs, pivotally-mounted means for supporting and guiding said heating element, and a detachably mounted plug receptacle so supported and positioned with respect to said supporting means that said terminal plugs will engage and make electrical contact with said plug receptacle when said heating element is moved in operative position.

8. In a device of the class described, the combination of an insulating supporting member having resistance wires and terminal plugs mounted thereon, a metal casing with a gridded top, said casing having means for detachably securing said insulating member therein, a base, supporting members having guideways for detachably and slidably mounting said casing thereon, and a detachably mounted plug receptacle so positioned that said terminal plugs will engage said plug receptacle when said incased insulating member is moved into operative position.

9. In a device of the class described, the combination of a base, side members pivotally mounted on said base and provided with guideways, a movable member for holding said side members in an upright position, a plug receptacle detachably secured to said movable member, said plug receptacle having terminals adapted to be connected to a source of electrical supply, an electrical heating element adapted to be supported by said guideways and provided with terminal plugs, and means for connecting or disconnecting said terminal plugs with said plug receptacle terminals.

This specification signed and witnessed this 3rd day of July, A. D. 1918.

WILLIAM P. ROBERTSON.

Signed in the presence of—
G. McGrann,
W. C. Margeson.